United States Patent [19]

Korling

[11] 4,341,452
[45] Jul. 27, 1982

[54] TRIAXIAL UNIVERSAL CAMERA MOUNT

[76] Inventor: Torkel Korling, 1410 Chicago Ave., Evanston, Ill. 60201

[21] Appl. No.: 291,272

[22] Filed: Aug. 10, 1981

[51] Int. Cl.³ ............................................. G03B 17/56
[52] U.S. Cl. ................................................... 354/293
[58] Field of Search .................... 354/81, 293, 294; 248/179, 183; 352/197, 243

[56] References Cited

U.S. PATENT DOCUMENTS

| | | | |
|---|---|---|---|
| 399,345 | 3/1889 | Poehlman | 248/179 |
| 1,177,165 | 3/1916 | Akeley | 248/183 |
| 2,305,233 | 12/1942 | Blaschke | 248/183 X |
| 2,481,717 | 9/1949 | Blair | 354/293 X |
| 2,842,026 | 7/1958 | Reese et al. | 354/293 X |
| 3,064,547 | 11/1962 | Humphries | 352/243 X |
| 4,044,364 | 8/1977 | Prinzo | 354/81 X |
| 4,255,036 | 3/1981 | Pincetich | 354/293 |

*Primary Examiner*—Donald A. Griffin
*Attorney, Agent, or Firm*—Jacques M. Dulin

[57] ABSTRACT

A triaxial (dual biaxial) universal camera mount assembly which permits a camera secured thereto to be independently or simultaneously pivotable about three axes: a vertical axis, a horizontal axis, and a central lens axis. The universal camera mounting has a first yoke pivotally nested in a second yoke to form the horizontal axis. The second yoke is mountable to a tripod so that it may pivot about a vertical axis normal to, but offset behind, the horizontal axis. The second yoke has a pivotable universal camera mounting bracket, the pivot axis of which corresponds to the central lens axis and intersects both the vertical axis and the horizontal axis. The yokes are canted and the vertical and central axis pivots offset so that a camera is completely balanced in the mount. The pivots are specially constructed so that the balanced camera can be moved from one position to another, yet it will stay in the second position without need of a locking means. The mount replaces a conventional tripod pan head and permits angular movement of the camera to any position without changes in view or focus introduction of parallax errors as is the case with conventional tripod mounts. The mount may also have a quick-release bayonet assembly for releasably attaching it to a tripod.

41 Claims, 16 Drawing Figures

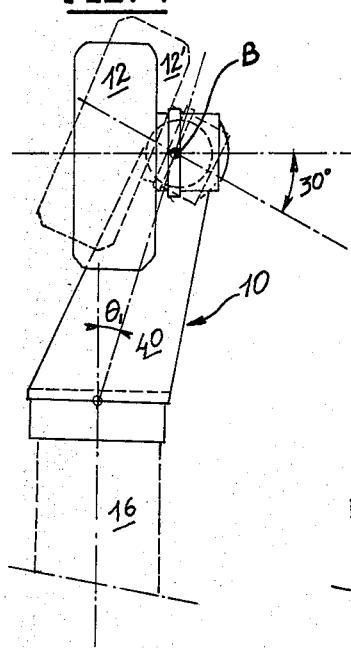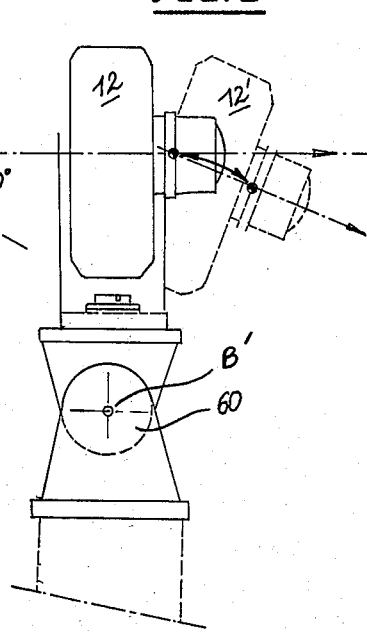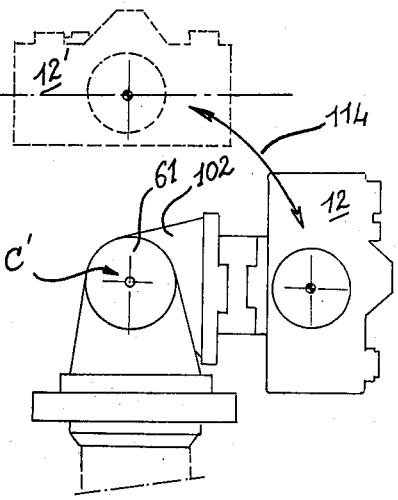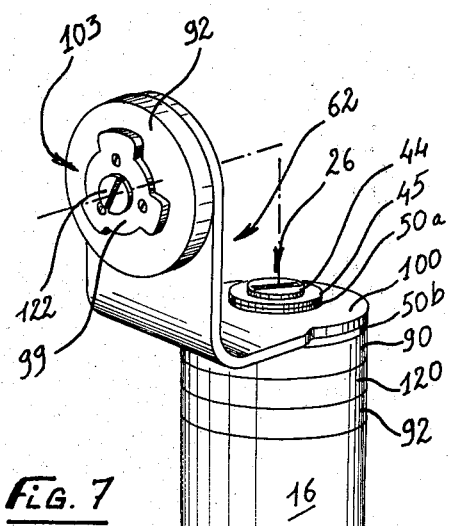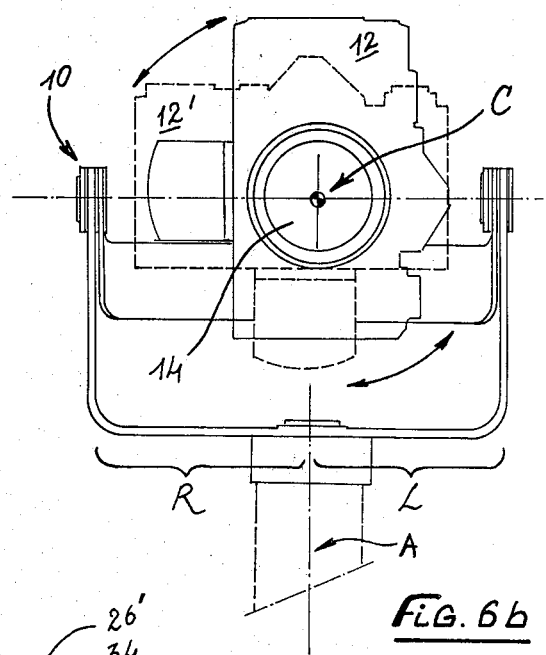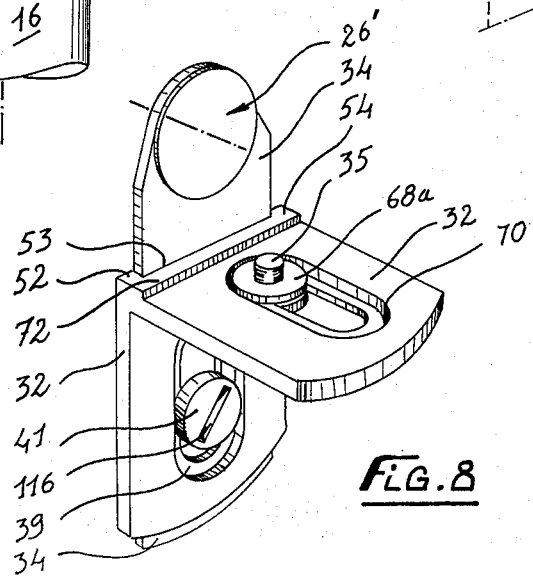

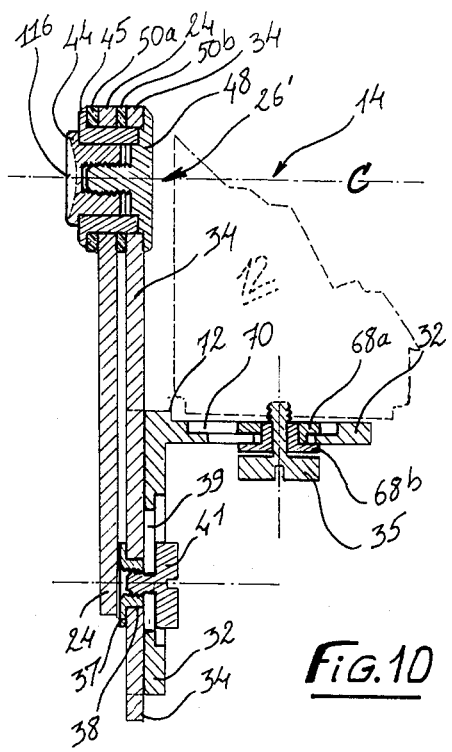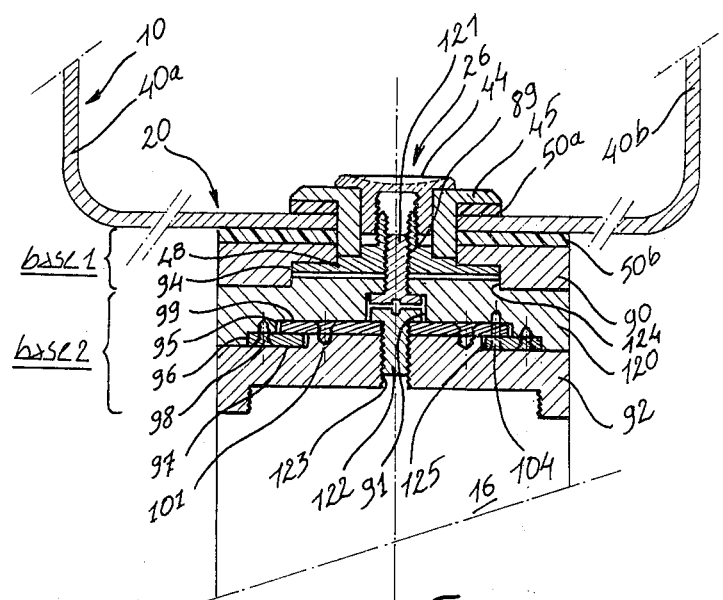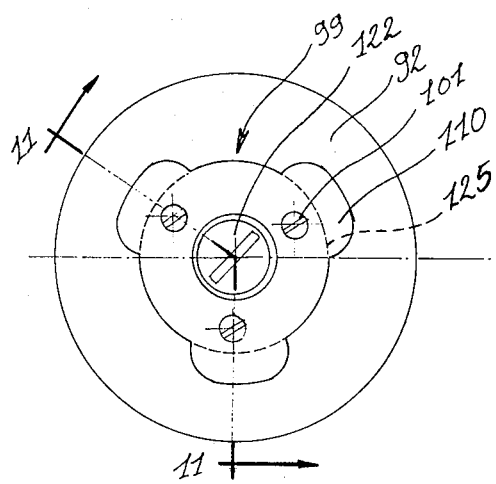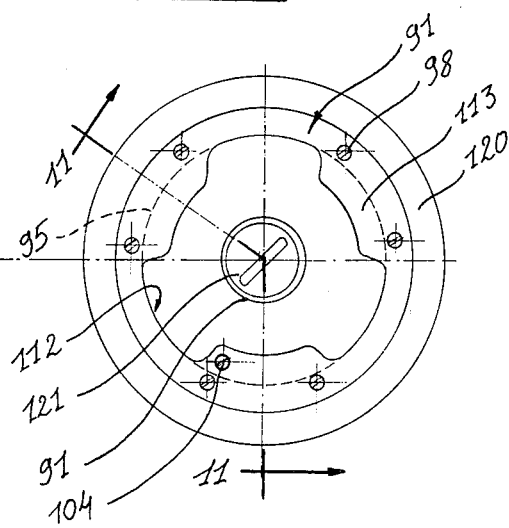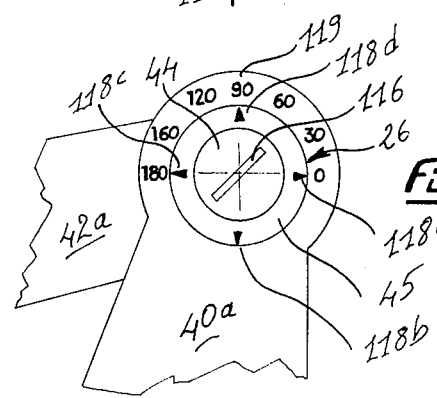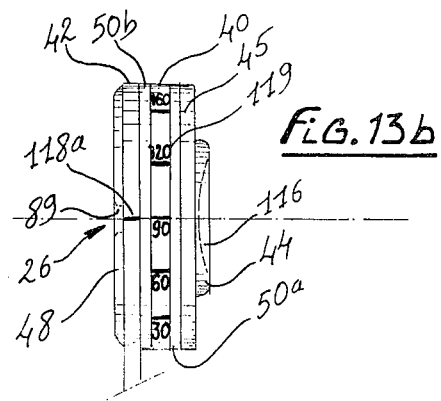

TRIAXIAL UNIVERSAL CAMERA MOUNT

FIELD OF THE INVENTION

This invention relates to camera mounts and, more particularly, to a triaxial (dual biaxial) universal camera mount with a quick-release tripod mount feature, which mount permits precise framing and composition of photographs and movement of the camera to any angular position without introduction of errors of focus, parallax or change in scene as the camera is moved between angular positions.

BACKGROUND

Conventional tripods provide a pan head on which the camera is mounted by a knurled knob having a threaded shank. Such pan heads typically consist of seven or more parts and provide only a limited degree of angular adjustability of the camera position with respect to the tripod. For example, when a camera on a pan head mount is tilted forward to view a scene below and forward of the camera, the camera is rotated about a horizontal axis 3-5" below the camera lens, and the original position of the focal point of the camera is changed with respect to the intended subject. For close-ups requiring accurate focusing, such movement of the focal point of the camera generally requires refocusing and/or repositioning of the entire tripod before a suitably composed and focused photograph may be taken of the desired subject.

In the conventional pan head tripod camera mount, each time the angular position of the camera is changed, a knob or handle must be turned which loosens a pivot so the camera can be moved to a different visual area, angle or position. Then the handle or knob must be tightened to fix the camera in its desired position. These adjustments often require the use of both of the hands of the photographer and tend to divert his attention from his intended subject to the mechanical tasks of repositioning the camera. Since photographers make many changes in camera position before selecting the final view, a process of artistic composition, the extensive refocusing/repositioning can result in lost time and, in some cases, missed shots. If precise repositioning or focusing is not done, the resulting photograph may be poor.

Further, in conventional pan head tripod mounts, changing the picture plane from a horizontal position to a vertical position requires a 90° rotation of the tripod head, to which the camera body is affixed, about a second pan head pivot. This rotation moves the focal point of the lens in an arc to one side of the tripod and lowers it. Such movement requires not only the loosening and retightening of the levers which hold the pan head pivot in its desired position, but also refocusing, repositioning the tripod, and recomposing the view on the intended subject of the photograph.

In the conventional pan head mount there is only limited angular motion. For example, in some mounts horizontal rotation of the camera about a vertical axis may only be possibel through 120°-220° before there is pivot or tripod leg interference. Similarly, vertical panning about a horizontal axis is typically about 90°-110° from about 45° down to 45° upward from horizontal.

In these conventional pan head mounts the camera, being heavy relative to the tripod, can cause the tripod to tip over because the center of gravity changes as the camera angle and orientation changes, e.g., a tilt of the camera downward or a change from a horizontal to vertical picture orientation. In all cases the levers or knobs must be manipulated, interfere with the tripod, flash cords, etc., and slow down the photographic process.

Besides the pan head tripod camera mount, various other attempts have been made to provide an adjustable camera mount that allows for adjustment of the camera about one or more axes. Examples of these are shown in the Humphries U.S. Pat. No. 3,064,547, and in the Akeley U.S. Pat. No. 1,177,165. Each of these shows very complex camera mounting devices requiring the manipulation of various gears, cranks, hand wheels and handles to adjust the camera position. Humphries is a large missile tracking camera device not practical for use with a standard single lens, hand-held camera. It employs a gimball ring rather than a double yoke, and the camera is mounted on a worm gear platform for fore and aft movement. The camera is not itself balanced, but the worm gear plateform requires rear projecting counterweights to balance the massive camera and camera platform. Everything is highly machined, is not portable by one person, the various gimball and azimuth cranks require several operators, and it is not adapted for standard camera tripod support. Akely is a motion picture camera mount for vertical or horizontal panning having a heavy cast iron arm suspending the camera holding mount from the top by a "cardanic" suspension so that by a pendulum effect the camera will seek a proper vertical axis relative to the base. A flywheel in the base damps any jerkiness during horizontal or vertical panning introduced by the panning wheels as they are turned by hand. Further, Poehiman U.S. Pat. No. 399,345 is an early attempt at a camera mount which employed curved brackets on which the camera slides. It has the same disadvantages as its more recent cousin, the pan head tripod mount. Blaschke U.S. Pat. No. 2,305,233 is a surveying instrument mount which includes a double yoke, the positioning of which is secured by wingnuts. The optics of the surveying instrument are off axis with respect to the yoke, being above and parallel to the horizontal axis, not set 90° thereto. Likewise, the instrument is not balanced and not intended for vertical scanning relative to the horizontal double yoke axis.

There is thus a need in the field for a camera mounting device which is independently adjustable along three axes and which does not require the loosening and retightening of various gears, cranks, wingnuts, knobs or handles to accomplish such adjustability. There is a need for a camera mounting device which is quickly disconnectable from a supporting tripod and which is universal, i.e., can accept all makes of SLR cameras. There is a further need for a triaxially pivotable camera mounting device in which the camera body is balanced and does not cause tipping over of the tripod. Such a tripod should permit a full range of angular adjustment with respect to all of the axes of rotation around the focal point of the camera.

THE INVENTION

OBJECTS

It is among the objects of the invention to provide a universal camera mount in which the camera is balanced and is independently or simultaneously adjustable about a vertical axis, a horizontal axis, and a central (lens) axis which passes through the camera lens, wherein such adjustability is accomplished by moving the camera body to the position desired, and once moved, will stay there.

It is another object of the invention to provide a universal, triaxially pivotable camera mount which allows adjustment of the camera body with respect to each axis such that each axis intersects at or adjacent the focal point of the camera lens.

It is another object of the invention to provide a pivot means for allowing adjustment of a camera mount whereby the camera position is maintained in position solely through the application of a frictional force between the pivot members.

It is another object of the invention to provide a universal, triaxially adjustable camera mount usable in connection with existing camera tripods.

It is another object of the invention to provide a means by which a camera mount may be quickly connected or disconnected from a camera tripod.

It is another object of the invention to provide a universal triaxial camera mount having dual biaxial pivot axes which provides a wide range of angular adjustment.

It is still another object of the present invention to provide a triaxial universal camera mount by which change of the camera orientation by varying degrees up or down from vertical does not change the relative focal point or the subject-to-camera distance, thus not requiring refocusing.

It is still another object of the invention to provide a triaxial universal camera mount by which change of the camera orientation from horizontal to vertical does not introduce parallax errors by not laterally translating the central lens axis, thus not requiring repositioning of the camera by angular rotation around a vertical axis to bring the object back into the center of the film and view field.

It is another object of this invention to provide a triaxial universal camera mount in which pivots are provided offset on a pair of nested, canted yokes so a wide variety of commercially available, hand-held SLR cameras may be mounted in substantial center of gravity balance and provides a wide range of angular movement without introduction of relative positional parallax errors.

Still further and other objects of the invention will be evident from the description and drawings.

DRAWINGS

The principles of the invention are better illustrated by the drawings in which.

Figure 9:
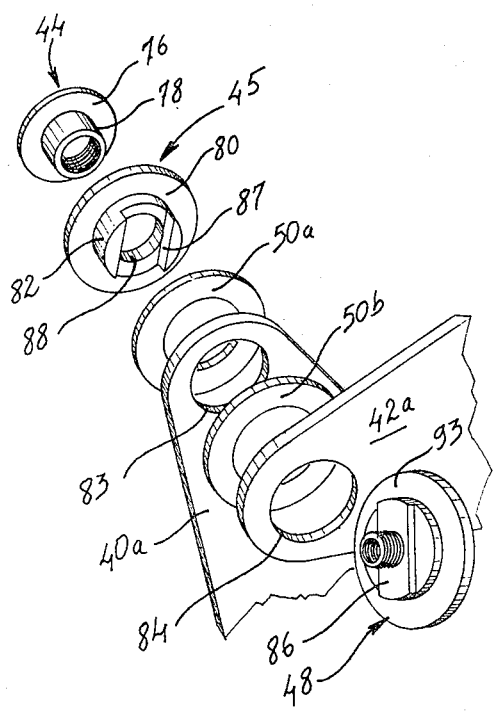

FIGS. 4, 5, 6a and 6b compare the present invention with a conventional pan head tripod mount;

FIG. 4 is a side view of the present invention illustrating the rotation and movement of the camera body about horizontal axis B to achieve a line of sight below the horizontal but without changing the camera-to-object distance;

FIG. 5 is a side view of a conventional pan head tripod mount illustrating in dotted line the change in position of the camera body, lens and film plane as the camera is pointed below the horizontal;

FIG. 6a is a front view of a conventional pan head tripod mount illustrating with an arced line the movement of the center of the film and view field (and of the lens axis) as the camera body is tilted from a horizontal picture plane orientation to a vertical picture plane orientation or vice versa:

FIG. 6b is a front view of the present invention illustrating the movement of the camera body from horizontal to vertical without translation of the lens axis or the center of the film or view field;

FIG. 7 illustrates a right-angled bracket permitting mounting the universal triaxial mount of this invention at a 90° vertical orientation so the camera can take photos vertically downwardly;

FIG. 8 is a front ¾ perspective view of the universal camera bracket to which the camera body is mounted;

FIG. 9 is an exploded view of the pivot assembly of this invention used to pivotally secure the yokes and bracket of the mount of this invention;

FIG. 10 is a side sectional view of the universal camera bracket shown attached to the mount of this invention:

FIG. 11 is a front sectional view of the mount of this invention attached to a tripod post by the quick release mounting assembly:

FIG. 12a is a top view of the male member of the quick-release bayonet mount;

FIG. 12b is a bottom view of the female member of the quick-release bayonet mount;

FIG. 13a is a side view of an arm of the first yoke illustrating a scale of degrees imprinted thereon to assist in accurate positioning of the line of sight up or down from the horizontal; and FIG. 13b is a top view of a pivot assembly joining the two yokes illustrating a scale of degrees imprinted thereon for movement up or down from the horizontal.

SUMMARY OF THE INVENTION

A triaxial (dual biaxial) universal camera mount comprising a double yoke and bracket system in which the camera is mounted substantially in center of gravity balance, and in which two pair of axes intersect at or near the focal point of a camera mounted thereon. The mount is adapted for use on standard tripods of the kind currently in use, and allows the picture plane of the camera to be moved in a full range of angular positions without significantly changing the camera-to-object distance, and therefore the focus of the camera. Picture composition is made easier and more quickly varied.

The mount is rendered adjustable from one fixed position to another (without the need of knobs, wing-nuts, or handles) by means of special pivot assemblies, each comprising a set of plastic friction washers connected by a nut and screw assembly between the various pivot points of the yokes and brackets of the mount. When the pivot assemblies are properly tightened, they provide a frictional effect such that the camera body may be easily moved but remains stationary in the position to which it is moved without any looosening or retightening of handles or knobs. This is also due in part to the fact that the camera is properly balanced in the mount so there is little or no movement of inertia to cause creep from a position to which the camera is set. Balance is achieved by the yokes being canted, and the arms and certain pivots being offset.

The mount is substantially universal for all hand-held SLR cameras in that it has an adjustable bracket to receive cameras of varying dimensions. In the preferred embodiment it is adjustable for use with most all currently marketed, hand-held 35 mm single lens reflex cameras.

The triaxial universal mount of the invention comprises a first yoke connectable to a standard camera tripod by virtue of a screw-threaded or bayonet-type (preferred) mount. The first yoke has a pair of arms each disposed at opposite ends thereof which form right angles to the central web portion of the yoke. These arms are canted forward to provide proper balancing of the camera. The yoke is pivotable about a vertical axis at its point of attachement to the tripod. This pivot point is offset from the centerline of the yoke to assist in balancing of the camera. This movement of the first yoke provides for left/right adjustment of the camera body position with respect to the tripod (horizontal panning).

Nested in, and pivotally connected to the first yoke at the extremeties of its arms, is a second, smaller yoke of a similar shape. The arms of the second, inner yoke are canted upwardly to permit proper collimation of the lens axis with a camera mounting plate pivot and to assist in proper balancing of the camera. The pivotable connections between the first and second yoke comprise a special screw and nut pivot assembly in which plastic friction washers are disposed on both sides of the arm of one of the yokes to provide an adjustable, frictional resistance to movement of the second yoke with respect to the first. When properly tightened, a uniform compressional force is exerted on the washers (principally at their perimeters), which allows the second yoke to be moved independent of the first yoke about a horizontal axis, but which permits the second yoke to remain in the position to which it was moved.

Disposed offset between the arms of the second yoke is a mounting plate which is pivotally attached to the second yoke by the special pivot assembly. This plate has a universal camera mounting bracket connected thereto by a screw and slot assembly. The special pivot assembly permits the plate to be rotated about its point of attachment to the second yoke, but will remain in the position to which it is moved. The camera mounting bracket is vertically slidably movable in its slot on the plate to permit vertical adjustment of the camera with respect to the rotational axis of the plate so that the lens axis can be collimated to the rotational axis of the plate. This bracket is so sized as to be universal, i.e., able to accept substantially all currently available, hand-held SLR cameras.

The camera body is attached to the universal camera mounting bracket by means of a "kept" screw passing through the bottom of bracket for coaction with the standard threaded hole contained on the bottom of the SLR camera body. This screw is of the non-dismountable, free-floating type to secure the camera to camera mounting bracket, and is horizontally adjustable in the slot in the bracket to receive cameras having varying tripod screw positions. This slot also allows for adjustment of the camera lens with respect to the horizontal axis to place the horizontal axis of the mount in or near the film plane or focal (or nodal) point of the camera, as desired. The slot also permits the back of the camera to be butted against an alignment shoulder on the bracket.

The offset of the vertical axis and the mounting plate (i.e., they are not on the centerline of the yokes) is an important feature of the invention. This permits the mount to accept hand-held SLR cameras in which both the lens axis and/or mounting hole in the base of the camera body are (or may be) offset with respect to the centerline of the camera body. Thus, currently available SLR cameras could not be used in prior art mountings without the axis being offset. and parallax errors are introduced in such mountings. Similarly, the cant of the yokes is important to the balance, and the repositionability without special locking means, features of the invention.

In the mount of the present invention a camera may be moved to a wide variety of positions, including 360° horizontally, 360° around the lens axis, and pointing completely vertically upwardly. By virtue of the special frictional pivot assembly in cooperation with offset and canted yokes and the center of gravity balance provided thereby, the camera will remain in the position to which it was moved without the need of wingnuts, knobs, or handles to "freeze" fix the camera in the desired position. For example, in contrast to a conventional pan head tripod mount, the focus of the lens does not change significantly when the camera is tilted downwardly or upwardly from a first to a second position (or vice versa). Thus, such movement does not require refocusing of the camera where the subject did not move. Similarly, recomposing a picture from horizontal format to vertical format is accomplished by simple rotation around the plate pivot, and no recomposing adjustment are required.

Repositioning the camera's picture plane vertically is accomplished by movement of the second, inner yoke relative to the first. This movement raises or lowers the "point of aim" of the camera lens. Horizontal (left, right) adjustment of the picture plane is accomplished by the rotation of the first yoke with respect to the tripod. This movement also does not disturb the vertical positioning of the picture plane. It should be noted that no knobs or handles are utilized in the positioning of the camera; hence, the photographer need not be concerned with the manipulation of various controls other than those on his camera. He or she is able to fully concentrate on the subject matter of the picture.

The yokes may be formed of any suitable material such as metal or strong plastic. Cold rolled aluminum yokes are preferred. The special pivot assembly which connects the yokes, camera mounting plate and first yoke to the tripod mount base may have a slot provided so that disassembly, loosening or tightening is accomplished by the use of the edge of a coin instead of a wrench or screwdriver, thereby requiring no other tools for adjustment, maintenance or disassembly. These pivots also preferably have provision for a central threaded hole in the nut portion so that various camera accessories may be fastened thereto, e.g., flash bars, light meters, etc.

A preferred feature of the invention is to removably secure the triaxial universal camera mount of the invention to a conventional tripod by a bayonet mount assembly which allows for quick mount-quick release from the tripod by a simple twist of the device with respect to the tripod. The first yoke can double as a carrying handle for the camera. The entire mount, being of lightweight construction, does not prevent use of the camera in the hand-held mode. Further, the mount base permits it being set flat on a table for use without a tripod, e.g., for macro-photography.

In an alternative embodiment, the yokes may be replaced by nested "L" shaped brackets rotatably mountable on a tripod. Rotatably joined to the first bracket is a second "L" shaped bracket. The second bracket has secured thereto the mounting plate and bracket assembly. The pivots are as above described.

In either of the embodiments the vertical arms of the first, outer yoke may be formed to facilitate hand-held use of the camera in the mount while on or free of the tripod. Likewise, a preformed or molded handgrip may be attached to one or more of the vertical or horizontal portions of the yokes to assist in gripping the mount. Angular positional markings may be scribed on the yokes at the pivot assemblies to assist in precise positioning of the camera. The angles may be recorded by the photographer so that the camera position, and therefore the view an picture composition, may be reproduced at a specified tripod location. For viewing 90° straight down, an L-shaped bracket may be used intermediate the bayonet base and the tripod head, and may be fitted with corresponding bayonet or screw mounting assemblies to mate with the universal mount and tripod head on the two arms, respectively.

DETAILED DESCRIPTION

The following detailed description is by way of illustration and not by way of limitation of the principles of the invention, and has reference to the drawings in which like parts have like numbers.

Figure 1:
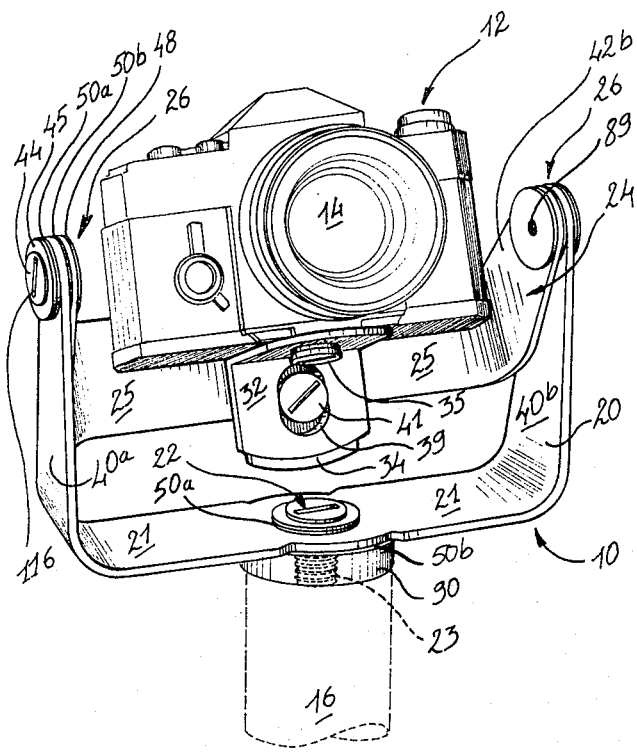
FIG. 1 is a front ¾ perspective view of the universal triaxial camera mount of this invention with a standard single lens reflex camera mounted thereto with the picture plane tilted upwardly about 30° from a horizontal position.
Figure 3:
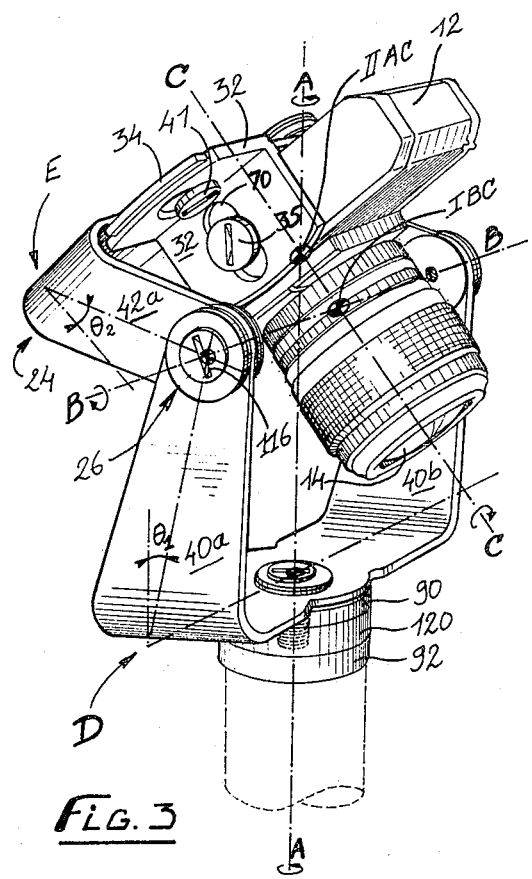
FIG. 3 is a ¾ side perspective view of the mount of the invention with the line of sight through the camera lens pointing downwardly some 60°-75° illustrating the three axes (as a pair of two intersecting axes) A, B and C about which the camera rotates in the mount, and illustrating the cant angle $\phi$ of both yokes.
Figure 2:
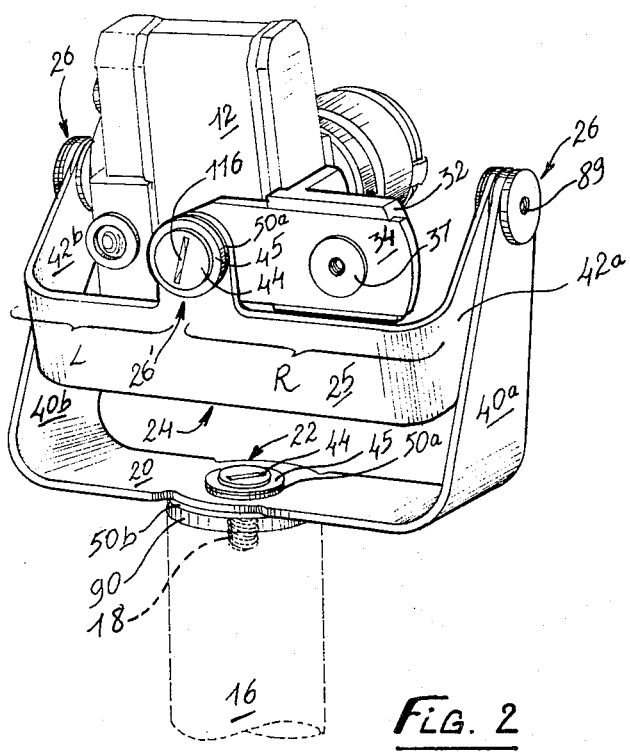
FIG. 2 is a back ¾ perspective view of the mount of the invention showing a standard single lens reflex camera mounted thereto with the picture plane in a vertical position and tilted upwardly about 15°-20° and illustrating the offset in the yokes.

Referring first to FIGS. 1–3, the triaxial universal camera mount 10 is shown with camera 12 mounted thereon. Camera 12 is a standard 35 mm (hand-held) SLR type having lens 14 offset about $\frac{3}{8}$-$\frac{1}{2}$" to the right (facing the camera) of the centerline of the camera body. Tripod 16 has first, outer yoke 20 pivotally connected thereto by attachment assembly 22 (best seen in FIG. 11). A number of alternative mountings for this yoke 20 to the tripod 16 are shown and disclosed. The simplest is bolt 23 extending through or from round plate 90 extending into engagement with a correspondingly threaded hole in the top of tripod shaft 16. Other embodiments, such as the preferred bayonet mount of FIGS. 3 and 11, are disclosed below.

Outer yoke 20 is pivotable about vertical axis A, as shown in FIG. 3. Outer yoke 20 has upstanding arms 40a, 40b formed thereon at opposite ends. Arms 40a,b are disposed at 90° angles to the base plane or web 21 of yoke 20. As best identified in FIG. 3 by arrow D, the arms 40a,b are canted forward by angle $\theta_1$ from normal (about 15°–30°), and are also tapered from the base to the ends containing pivot assembly 26.

In another embodiment (FIG. 2) attachment assembly 22 may comprise a threaded nut 44 and lock washer 45 mated with the standard threaded tripod bolt 18 extending upward through round metal plate 90 to engage the nut 44. Plastic washers 50a and 50b (e.g., of nylon) are disposed therebetween. As bolt 18 is tightened, a resultant force is exerted against washers 50 which act as a friction surface for the rotation of yoke 20. When properly tightened, yoke 20 will be rotatable about axis A (FIG. 3); however, the frictional force generated through assembly 22 will cause yoke 20 to remain in the position to which it was then moved.

Continuing with FIGS. 1–3, pivotally connected to yoke 20 at the ends of arms 40a,b is a second, inner yoke 24. Yoke 24 has upstanding arms 42a,b at each end of back plate 265. Note in FIG. 3 the relationship of the arms 42 to back plate 25 is illustrated at E with the midline of arm 42a being canted angle $\phi_2$ (approximately 20°–40°) upwardly from normal; this cant is also evident in FIG. 2. The arms of both yokes are at right angles to their respective back plates but are also canted and tapered. FIG. 2 also illustrates the offset location of the pivots 22 and 26 in both yokes, the left portion L of yokes 20 and 24 (seen from the back) being shorter than the right portion R. The offset is on the order of $\frac{3}{8}$"–$\frac{3}{4}$" to provide proper intersection of the A (vertical and C (lens) axes at point II-AC (FIG. 3).

Arms 42a,b of the inner yoke 24 are attached to arms 40 of outer yoke 20 by pivot assemblies 26. Pivot assemblies 26 comprise nut 44 with lock washer 45 adjacent thereto connected to bolt 48 and having washer 50 disposed between the lock washer 45 and arm 40, and washer 50b disposed between the two arms 40, 42. Washers 50a,b are formed of plastic to correspond to the dimensions of bolt 45 and lock washer 45. The parts of the pivot assembly are described in more detail with reference to exploded view FIG. 9 below.

When properly tightened, the pivot assembly 26 permits movement of inner yoke 24 with respect to outer yoke 20, yet the inner yoke 24 remains in the position to which it was moved. Inner yoke 24 rotates about horizontal axis B as shown in FIG. 3 which is seen to intersect the lens axis C at point I-BC. As the camera center of gravity is in balance on the mount, there is little movement of inertia to cause the yoke 24 to move from a particular position in which it is set.

Camera 12 is shown oriented for a vertically composed photo in FIG. 2. The camera is pivotally mounted to inner yoke 24 by means of camera bracket 32 and mounting plate 34. Mounting plate 34 has camera bracket 32 slidably secured thereto. Plate 34 is pivotally joined to yoke 24 by pivot assembly 26' which allows the mounted camera 12 to pivot about lens axis C shown in FIG. 3.

In FIGS. 3, 8 and 10, kept screw 35 is shown rotatably secured by slide washer assembly 68a,b (FIG. 10) into slideway 70 of mounting bracket 32. Slide washer parts 68a,b press fit together so that screw 35 is captured. Screw 35 threads into the hole provided in the base of single lens reflex cameras so that the back of camera 12 is aligned with and may just contact pivot 26'.

In FIGS. 2 and 3 camera 12 is shown with its body in a vertical orientation with respect to the tripod 16. Camera 12 is pivotable about axis C (shown in FIG. 3) by virtue of pivot 26' securing mounting plate 34 to inner yoke 24. This pivot 26' includes a plastic washer 10b (see FIG. 1) ) between the front face of inner yoke 24 and mounting plate 34, and one between the lock washer 45 and the back face of inner yoke 24. When pivot assembly 26' is appropriately tightened, a peripheral, annular frictional force is created, allowing the mounting plate 34 (on which are assembled mounting bracket 32 and camera 12) to rotate at least 90°, and up to 360°, about axis C and to remain in the position to which it is moved.

It is an important feature of the invention that rotation of camera 12 about axis C does not involve any lateral movement of the camera body 12 or lens 14 with respect to tripod 16 (see FIGS. 6a and 6b). Thus, changing the camera lens from a vertical to a horizontal orientation (and vice versa) does not change the position of the photographic subject in the center of the field. Changing the framing format from horizontal to vertical, and vice versa, are easily done without changing the basic composition and without introduction of parallax errors. This is best seen by comparing FIG. 6a with FIG. 6b, the former showing horizontal arcuate translation of the camera in the case of a conventional pan head tripod mount. FIG. 6b shows rotation of the camera around the lens axis from vertical (12 in solid lines) to horizontal (12' in dashed lines).

Viewing now FIGS. 1–3, 8 and 10, camera bracket 32 is vertically adjustable with respect to plate 34. Nut 37 is press fit into hole 38 in plate 34 and receives screw 41 which fits in recessed slideway 39 in bracket 32. Screw 41 is loosened and bracket 32 raised or lowered to align the camera lens axis C with the axis of pivot 26'. The screw 41 is then tightened. This adjustment feature allows varying kinds of SLR cameras to be used with the invention and the axis of lens 14 collimated to the axis of pivot 26', thereby allowing the picture format to be changed from horizontal to vertical, or vice versa, with a negligible displacement of the intended subject.

FIGS. 4 and 5 illustrate another advantage of the mount of the present invention (FIG. 4) as compared to that of a conventional pan head tripod mount (FIG. 5), when photographing a subject below the horizontal (for example, a short distance photo or close up of woodland flowers). Also shown in FIG. 4, the position of the camera 12 after its rotation about axis B (shown as point B) is shown at 12' in dashed lines.

FIG. 5 illustrates a corresponding tilt of camera body 12 in a conventional pan head tripod to a similar angle around axis B' in pivot 60 which is below the camera. As the movement in FIG. 5 of the camera lens and hence the subject-to-object distance is substantial, the camera must be refocused or repositioned, or both, to properly compose and focus the photograph.

FIG. 6a shows the movement of camera body 12 in changing from a vertical picture format to a horizontal in a conventional tripod. Camera body 12 pivots on a head 102 about pivot 60 having a central axis C' (shown as point C') which is some distance from the central axis of the lens of camera 12. Changing the picture plane from a vertical to a horizontal alignment moves the camera body and lens to the side of the tripod and lowers it substantially as shown by arc of travel 114. This movement requires the recomposing of the picture before a photograph may be taken. To bring the lens back to its center, it is necessary to lengthen tripod legs and move the entire tripod to compensate for misalignment.

In contrast, FIG. 6b illustrates the advantage of the prevent invention where camera 12 pivots about axis C (shown as point C) at the center of the lens 14.

FIG. 7 illustrates an L-bracket assembly 62 to a tripod but without the universal triaxial camera mount of the invention thereon. This bracket has a baseplate portion 100 and an upstanding arm 102. The preferred bayonet mounting assembly 90, 120, 92 (described in detail in connection with FIGS. 11, 12a and 12b below) is secured to the baseplate 100 by pivot assembly 26. This permits quick mount, dismount of the L-bracket 62. A male bayonet assembly 103 comprising disc 92 on which is mounted male bayonet plate 99 is secured to the outer face upstandiing arm 102 by screw 122. The universal triaxal mount 10 then attaches to the male bayonet assembly 103 by means of its baseplate and female bayonet assembly 90, 120 (not shown in FIG. 7) as best seen in FIG. 11. The mount 10 is then oriented for taking pictures vertically downwardly, e.g., macrophotography, document reproduction or the like. In another alternative the male bayonet assembly 103 may be mounted on the inner face of upstanding arm 102 by screw 122. This provides better balance, on the tripod, moving the center of gravity of the camera closer to the vertical axis of tripod column 16, yet the arms 10a,b of the outer yoke are long enough to provide clearance for the vertical photo.

FIGS. 8 and 10 illustrate the plate 34 and camera bracket 32 assembly. Camera bracket 32 is adjustable in recessed slideway 39 and held in place by screw 41 and nut 37 (FIGS. 2 and 10). When screw 41 is tightened, bracket 32 is held immovably against plate 34. Rotation of bracket 32 with respect to plate 34 is prevented by shoulders 52 and 54, defining a keyway 53 therebetween. Camera 12 is mounted on bracket 32 such that kept screw 35 mates with the threaded hole on the underside of standard single lens reflex cameras. Slide washer assembly 68a,b slides within slideway 70 such that screw 35 may move and adjust to fit the varying front to aft dimensions of various single lens reflex camera bodies. Shoulder 72 insures that the camera back just clears the face of the pivot 16'.

Pivot assembly 26 (and 26') is shown in exploded view in FIG. 9. Threaded nut 44, having an enlarged flat head 76 and a tubular portion 78, pivotally inserts within opening 88 defined in lock washer 45. The lock washer also has an annular ring portion 80. Plastic washer 50a fits over the tubular shank portion 82 of lock washer 45. Hole 83 defined in arm 40 of outer yoke 20 is then fitted over the tubular portion 82 of lock washer 45 and butts against plastic washer 50a. Washer 50b fits on the opposite (inner) side of arm 40a over the tubular portion 82 of lock washer 45. Hole 84 defined in arm 42 of second (inner) yoke 24 is placed over the tubular portion 82 of washer 45 and butted against plastic washer 50b. Screw 48 with enlarged head portion 93 then connects all of said parts by mating with the threads in the tubular portion 78 of nut 44. Key 86 in screw 48 fits receivably within slot 87 of lock washer 45 thereby insuring that lock washer 45 may not turn independently of nut 44 or screw 48. In this manner the pivot assemblies 26,26' through proper tightening will allow the yoke arms to move independently of each other but will permit them to remain in the position to which they were moved.

The above description of the assembly of yoke pivot assembly 26 applies also to the assembly of the mounting plate pivot 26'. These pivots 26 and 26' preferably have the nut 44, lock washer 45 and screw portion made of brass. The nuts 44 may be tightened with a double pronged spanner inserted in a pair of spaced apart small holes drilled in the outside face of the nut, or by a keyway 116 which will accept a coin, for example, a quarter. Such keyways are preferred to be used on the pivots 26, 26', the screws 35, 41, and the baseplate attachment assembly 22.

Referring now to FIG. 10, inner yoke 24 with camera bracket 32 and plate 34 are shown in a side section view. Pivot 26' is shown fully assembled with axis C forming the rotational point about which plate 34 pivots. Camera bracket 32 is shown in section with its keyway slid over and secured in place by screw 41 (shown spaced approximately in the middle of slideway 39). Camera body 12 is partially shown secured to screw 35 on bracket 32. Plastic washer 50b provides clearance for nut 37.

As noted above with respect to FIG. 2, the mount of this invention may be fastened to a standard tripod by a nut which fastens onto the knurled screw 18 provided in the tripod head. However, a quick release mount of the type shown in FIG. 11 is preferred. FIG. 11 also shows the use of a pivot assembly 26 modified with a ¼"-20 threaded hole 89 in the screw 48 (not visible in FIG. 9) so that a standard tripod screw may be threaded therein for direct attachment to the tripod head. For this embodiment, the balance of the bayonet assembly (described below) is not required.

The preferred quick disconnect bayonet assembly is shown in FIG. 11. The pivot assembly 26 secures metal disc 90 to the base plane 21 of outer yoke 20 by bolt 48 being threaded into the nut 44, with the lock washer 45 and the two plastic washers 50a,50b being in place therebetween. Note washer 50b is much enlarged to provide an adequate bearing surface for the yoke web 21 on the disc 90. Recess 94 in the bottom of the disc receives the head 93 of the screw 48. This comprises the first alternative base (non-bayonet embodiment) in which ¼"-20 threaded hole 89 receives the standard tripod screw for mounting directly onto a conventional tripod. In use on the standard tripod, the pan head levers are tightened so the head does not move.

In the bayonet alternative (FIG. 11), screw 121, seated in recess 91 in the upper, female bayonet disc 120, secures that round disc 120 to the baseplate 90. Female bayonet disc 120 also has a raised circular shoulder 124 which fits into the recess 94 in the base disc 90.

Looking now at FIGS. 11 and 12b, female bayonet plate 97 is secured in recess 96 on the lower face of female bayonet disc 120 by screws 98. A second, annularly inner and deeper recess 95 in disc 120 receives male bayonet plate 99 (FIGS. 11 and 12a) which is secured on raised circular shoulder 125 on tripod head cap 92 by screws 101. The head cap 92 in turn is screwed onto the top of the tripod post 16. As seen in FIGS. 11, 12a and 12b, in operation the bayonet plates are mated by aligning female plate 97 so that the flanges 110 of male clip 99 are inserted in flange openings 112 and then rotated so the outer faces of flanges 110 contact the inner faces of flanges 113 on the female bayonet 97, and the edge of one of the flanges 110 contacts stop pin 104. In this manner the camera mount of this invention is easily secured to tripod 16 and, likewise, the bayonet mount permits a quick and uncomplicated release of the mount of the invention from the tripod. Note that centering screw 122 is mounted in threaded hole 123 in cap 92, and is adapted to fit into recess 91 in the female bayonet disc 120. This assists in proper alignment of the bayonets for quick mount and quick release.

Referring now to FIGS. 13a and 13b, the upper end of arm 40a of first (outer) yoke 20 is shown in side view. Lock washer 45 is shown with a number of indicating lines 118a,b,c,d, set at 90° to each other, scribed thereon to cooperate with a set of angular markings (scale of degrees) 119 on the head of arm 40 which has been enlarged to receive the angular markings. As the arm 42 of the inner yoke 24 is moved, the angle through which it moves with respect to the first yoke 20 is indicated.

FIG. 13b illustrates a top view of the arm assembly of FIG. 13a in which the edge of arm 42 has inscribed thereon the indicator lines 118a (118b,c,d being not visible in this view), which show the relative angular motion when compared to the degree scale 119 scribed on the edge of the arm 40.

It should be understood that various modifications within the scope of this invention can be made by one of ordinary skill in the art without departing from the spirit thereof. For example, the pivot assembly may be reversed as seen by comparing FIGS. 1 and 2, and the angular markings may be applied to the pivots at each of the axes, e.g., at pivot 22 for the vertical axis A and at pivot 26' for the lens axis C. The camera mounting bracket 32 and plate 34 may be modified to accept the Hasselblad and Bronica type cameras by a rotary (gimmal) type mounting which encircles the camera or lens to effect the same principles as herein described.

In addition, the triaxial universal mount shown herein is particularly described with reference to the preferred embodiment and bese mode as a dual biaxial mount employing a pair of two intersecting axes, i.e., two pair of axes, the intersection points of which are on a common axis, the lens axis C. These two axes intersection points can be merged into a single point for intersection at a triple point which may be selected as most appropriate for the particular camera, e.g., the nodal point, focal point or at the film plane, as desired.

In still another embodiment, the arms of both yokes need not be offset, so that both the left side L and right side R (see FIGS. 2 and 6b) are of equal length. While the camera sides will then not be spaced equally from the arms 40a,42a and 40b,42b, this will not affect the operation of the universal mount.

The plate 34 and bracket 32 may also contain setting markings (not shown) identifying particular cameras so that when the plate 34 and bracket 32 are aligned therewith and screws 35 and 41 tightened, the bracket will be properly set for such cameras. Thus, there may be markings for Canon, Nikon, Mamiya, Leica, etc., brand cameras.

It should be noted that where the camera is pointing horizontally, the back 25 of the inner yoke 24 is in a plane perpendicular to the plane of the base plate 21 of the outer yoke 20. Further, the mount is designed to accommodate not only a variety of cameras, but also a variety of lenses. With longer telephoto lenses, the center of mass (gravity) of the camera is shifted forward, and having a dual biaxial mount assists in maintaining balance. For example, typically the center of gravity of the camera lies between the pair of axes intersections I-BC and II-AC or close to one of them. Where the lens 14 in FIG. 3 is a telephoto, say a 105 mm lens, the center of gravity may be shifted more closely to intersection point I-BC; even if it lies outside (forward) of that point, it is not so far forward that the rotational moment causes creep of the horizontal axis pivots.

I therefore wish my invention to be defined by the scope of the appended claims as broadly as the prior art will permit, and in view of this specification if need be.

I claim:

1. An improved camera mount comprising in operative combination:
   (a) a first, outer yoke having a planar base portion and a pair of upstanding arms at opposite ends of said base portion;
   (b) a second, inner yoke having a pair of upstanding arms and a planar back portion therebetween;
   (c) said inner yoke being nested within and pivotally connected by a pair of pivot assemblies to said first yoke adjacent the ends of the arms thereof, said pivot assemblies being aligned to form a horizontal axis;
(d) said outer yoke having means defining a pivotable connection to a tripod disposed in said base portion for releasably securing said mount on said tripod, said base pivotable connection defining a vertical axis normal to said horizontal axis;
(e) means defining a pivot assembly disposed in said inner yoke back for pivotally securing a camera holder assembly to said inner yoke, said inner yoke back pivot assembly defining a third axis normal to said horizontal and vertical axes;
(f) a universal camera holder assembly means for removably securing a camera secured to said inner yoke by said inner yoke back pivot assebly, said universal camera holder assembly having means for adjusting the position of the axis of a lens of said camera so that said lens axis is collimated with said third axis;
(g) said horizontal axis and said vertical axis intersecting said collimated third, lens axis;
(h) said pivot assemblies, base pivotal connection, and inner yoke back pivot assembly being adapted to provide sufficient frictional resistance to turning to permit said yokes and camera to be pivoted from a first to a second position and remain in said second position to which pivoted;
(i) said yokes and universal camera holder assembly means being adapted to maintain said camera substantially in balance about its center of gravity; and
(j) said elements (a) through (i) incombination providing a triaxial universal camera mount removably securable to a manually portable tripod, and permitting:
(i) rotational movement of said camera from a horizontal to vertical frame orientation around the lens axis, and
(ii) upward or downward tilting of said camera around the horizontal axis
without introduction of translational or parallax errors necessitating reframing or refocusing of the camera, and without manipulation of pivot releasing/tightening levers.

2. An improved camera mount as in claim 1 wherein said pivot assemblies and said inner yoke back pivot assembly comprise in operative combination:
(a) a threaded nut having an enlarged head and a tubular shank portion;
(b) a lock washer having an enlarged annular ring portion and a tubular shank portion terminating in a transverse slot;
(c) a pair of planar, annular, low friction washers;
(d) a bolt having a threaded shank, an enlarged head, and a transverse key disposed on the inner face of said head intersecting said threaded shank;
(e) said low friction washers being disposed on each side of a movable member of said camera mount between said screw and said lock washer;
(f) said tubular shank of said lock washer extending axially so that said slot receives said key and provides between the inner surface of said annular ring and the inner surface of said bolt head space sufficient to accommodate both low friction washers and at least one movable member of said mount;
(g) said bolt threads engageable with said nut threads to provide sufficient compression of said low friction washers at annular peripheries thereof in contact with movable members of said mount in contact therewith so that said movable members may be manually easily moved with respect to each other and will stay in the position to which moved without unscrewing said assemblies or tightening them after each repositioning.

3. An improved camera mount as in claim 2 wherein said pivotal connection to a tripod includes:
(a) first bayonet means for quick-connect, quick-disconnect from a second, mating bayonet means connected to said tripod.

4. An improved camera mount as in claim 2 wherein at least one of said pivot assemblies and said inner yoke back pivot assembly:
(a) said threaded bolt shank is a tubular member, the inner surface of which defines a threaded hole extending axially therethrough for securing accessories by means of a threaded bolt mating therewith.

5. An improved camera mount as in claim 4 wherein:
(a) said intersection of said lens axis with said vertical axis is spaced axially apart from said intersection of said lens axis with said horizontal axis forming a dual, biaxial system.

6. An improved camera mount as in claim 5 which includes:
(a) bracket means disposed intermediate said mount and said tripod for orienting said mount with said outer yoke at right angles to the horizontal to permit said lens axis to be directed vertically downwardly.

7. An improved camera mount as in claim 5 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

8. An improved camera mount as in claim 2 wherein:
(a) at least one of said yokes is adapted so that said arms thereof are canted at an angle from said back or base plates, respectively.

9. An improved camera mount as in claim 8 wherein:
(a) said inner yoke back pivot and said pivotal connection disposed in said outer yoke base portion are each offset equally to one side of a centerline defined between said yoke arms, and said back pivot and pivotal connection are aligned so that said lens axis intersects said vertical axis.

10. An improved camera mount as in claim 9 wherein said pivotal connection to a tripod includes:
(a) first bayonet means for quick-connect, quick-disconnect from a second, mating bayonet means connected to said tripod.

11. An improved camera mount as in claim 10 wherein at least one of said pivot assemblies and said inner yoke back pivot assembly:
(a) said threaded bolt shank is a tubular member, the inner surface of which defines a threaded hole extending axially therethrough for securing accessories by means of a threaded bolt mating therewith.

12. An improved camera mount as in claim 10 which includes:
(a) bracket means disposed intermediate said mount and said tripod for orienting said mount with said outer yoke at right angles to the horizontal to permit said lens axis to be directed vertically downwardly.

13. An improved camera mount as in claim 10 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

14. An improved camera mount as in claim 2 wherein:
    (a) said intersection of said lens axis with said vertical axis is spaced axially apart from said intersection of said lens axis with said horizontal axis forming a dual, biaxial system.

15. An improved camera mount as in claim 14 wherein:
    (a) at least one of said yokes is adapted so that said arms thereof are canted at an angle from said back or base plates, respectively.

16. An improved camera mount as in claim 15 wherein:
    (a) said inner yoke back pivot and said pivotal connection disposed in said outer yoke base portion are each offset equally to one side of a centerline defined between said yoke arms, and said back pivot and pivotal connection are aligned so that said lens axis intersects said vertical axis.

17. An improved camera mount as in claim 16 wherein said pivotal connection to a tripod includes:
    (a) first bayonet means for quick-connect, quick-disconnect from a second, mating bayonet means connected to said tripod.

18. An improved camera mount as in claim 17 wherein at least one of said pivot assemblies and said inner yoke back pivot assembly:
    (a) said threaded bolt shank is a tubular member, the inner surface of which defines a threaded hole extending axially therethrough for securing accessories by means of a threaded bolt mating therewith.

19. An improved camera mount as in claim 17 which includes:
    (a) bracket means disposed intermediate said mount and said tripod for orienting said mount with said outer yoke at right angles to the horizontal to permit said lens axis to be directed vertically downwardly.

20. An improved camera mount as in claim 17 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

21. An improved camera mount as in claim 2 wherein:
    (a) said inner yoke back pivot and said pivotal connection disposed in said outer yoke base portion are each aligned with the centerline defined equidistant between said yokes.

22. An improved camera mount as in claim 21 wherein:
    (a) at least one of said yokes is adapted so that said arms thereof are canted at an angle from said back or base plates, respectively.

23. An improved camera mount as in claim 22 wherein said pivotal connection to a tripod includes:
    (a) first bayonet means for quick-connect, quick-disconnect from a second, mating bayonet means connected to said tripod.

24. An improved camera mount as in claim 23 wherein at least one of said pivot assemblies and said inner yoke back pivot assembly:
    (a) said threaded bolt shank is a tubular member, the inner surface of which defines a threaded hole extending axially therethrough for securing accessories by means of a threaded bolt mating therewith.

25. An improved camera mount as in claim 23 which includes:
    (a) bracket means disposed intermediate said mount and said tripod for orienting said mount with said outer yoke at right angles to the horizontal to permit said lens axis to be directed vertically downwardly.

26. An improved camera mount as in claim 23 where at least one of said pivot assemblies, said outer yoke pivotal connection, and said inner yoke back pivot assembly having means for identifying angular position disposed in association therewith so that the position and change in position upon movement of the camera about one or more of the said three axes can be determined.

27. An improved camera mount as in claim 1 wherein said three axes intersect substantially at a single point.

28. An improved camera mount as in claim 27 wherein said pivotal connection to a tripod includes:
    (a) first bayonet means for quick-connect, quick-disconnect from a second, mating bayonet means connected to said tripod.

29. An improved camera mount as in claim 28 wherein at least one of said pivot assemblies and said inner yoke back pivot assembly:
    (a) said threaded bolt shank is a tubular member, the inner surface of which defines a threaded hole extending axially therethrough for securing accessories by means of a threaded bolt mating therewith.

30. An improved camera mount as in claim 28 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

31. An improved camera mount as in claim 27 wherein said pivot assemblies and said inner yoke back pivot assembly comprise in operative combination:
    (a) a threaded nut having an enlarged head and a tubular shank portion:
    (b) a lock washer having an enlarged annular ring portion and a tubular shank portion terminating in a transverse slot;
    (c) a pair of planar, annular, low friction washers;
    (d) a bolt having a threaded shank, an enlarged head, and a transverse key disposed on the inner face of said head intersecting said threaded shank;
    (e) said low friction washers being disposed on each side of a movable member of said camera mount between said screw and said lock washer;
    (f) said tubular shank of said lock washer extending axially so that said slot receives said key and provides between the inner surface of said annular ring and the inner surface of said bolt head space sufficient to accommodate both low friction washers and at least one movable member of said mount;

(g) said bolt threads engageable with said nut threads to provide sufficient compression of said low friction washers at annular peripheries thereof in contact with movable members of said mount in contact therewith so that said movable members may be manually easily moved with respect to each other and will stay in the position to which moved without unscrewing said assemblies or tightening them after each repositioning.

32. An improved camera mount as in claim 31 wherein:

(a) said inner yoke back pivot and said pivotal connection disposed in said outer yoke base portion are each aligned with the centerline defined equidistant between said yokes.

33. An improved camera mount as in claim 32 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

34. An improved camera mount as in claim 33 wherein said pivotal connection to a tripod includes:

(a) first bayonet means for quick-connect, quick-disconnect from a second, mating bayonet means connected to said tripod.

35. An improved camera mount as in claim 34 wherein at least one of said pivot assemblies and said inner yoke back pivot assembly:

(a) said threaded bolt shank is a tubular member, the inner surface of which defines a threaded hole extending axially therethrough for securing accessories by means of a threaded bolt mating therewith.

36. An improved camera mount as in claim 34 which includes:

(a) bracket means disposed intermediate said mount and said tripod for orienting said mount with said outer yoke at right angles to the horizontal to permit said lens axis to be directed vertically downwardly.

37. An improved camera mount as in claim 34 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

38. An improved camera mount as in claim 34 which includes:

(a) bracket means disposed intermediate said mount and said tripod for orienting said mount with said outer yoke at right angles to the horizontal to permit said lens axis to be directed vertically downwardly.

39. An improved camera mount as in claim 1 wherein at least one of said pivot assemblies, said outer yoke pivotal connection, and said inner yoke back pivot assembly having means for identifying angular position disposed in association therewith so that the position and change in position upon movement of the camera about one or more of the said three axes can be determined.

40. An improved camera mount as in claim 1 wherein at least one of said pivot assemblies and said inner yoke back pivot assembly:

(a) said threaded bolt shank is a tubular member, the inner surface of which defines a threaded hole extending axially therethrough for securing accessories by means of a threaded bolt mating therewith.

41. An improved camera mount as in claim 1 wherein:

(a) said intersection of said lens axis with said vertical axis is spaced axially apart from said intersection of said lens axis with said horizontal axis forming a dual, biaxial system.

* * * * *